United States Patent [19]

Wingate

[11] Patent Number: 4,648,852
[45] Date of Patent: Mar. 10, 1987

[54] TURKEY CALL

[76] Inventor: Landry R. Wingate, Rte. 2, Box 52, Pitkin, La. 70656

[21] Appl. No.: 746,286

[22] Filed: Jun. 19, 1985

[51] Int. Cl.$^4$ .............................................. A63H 5/00
[52] U.S. Cl. .................................................. 446/397
[58] Field of Search ............................... 446/397, 418

[56] References Cited

U.S. PATENT DOCUMENTS

| 3,129,527 | 4/1964 | Williams | 446/397 X |
| 3,208,184 | 9/1965 | Wisor | 446/397 X |
| 4,041,639 | 8/1977 | Funk | 446/397 X |
| 4,310,986 | 1/1982 | Jacobs | 446/397 X |

Primary Examiner—Mickey Yu
Attorney, Agent, or Firm—John M. Harrison

[57] ABSTRACT

A turkey call which includes as a first element, a rectangular call box open at one end to define an internal sound chamber and constructed of cedar side and end strips, a formica cap and base and a slate plate located on the cap and coextensive in size with the sound chamber. A striker is provided as a second element and includes a solid plastic striker tip attached to a handle, and the handle is further characterized by a handle sound chamber which communicates with the plastic striker tip by means of an interior plenum. The striker tip is bevelled at the extending end, with the bevel terminating in a rounded tip end for engaging the slate striker plate on the call box and simultaneously emitting sounds from the call box sound chamber and striker sound chamber to simulate the call of a wild turkey.

20 Claims, 6 Drawing Figures

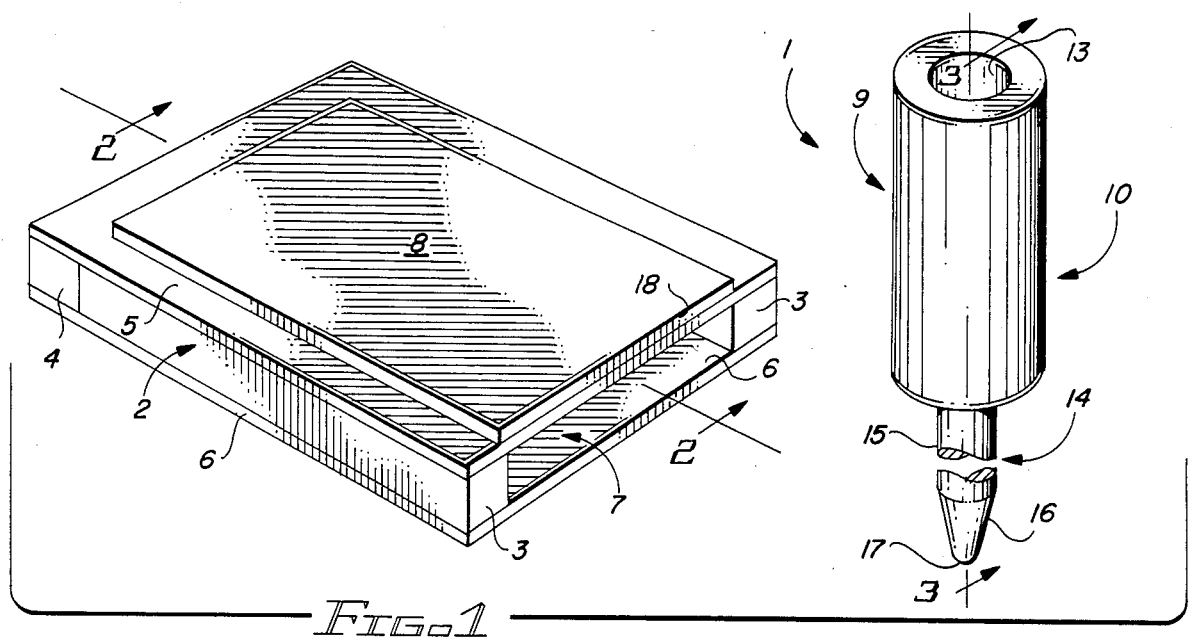
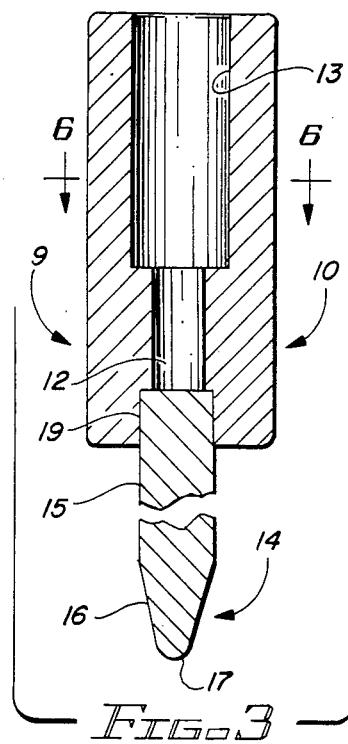
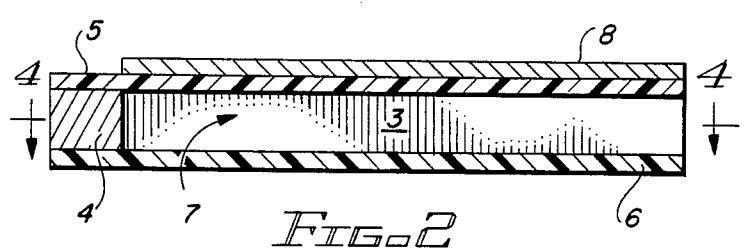
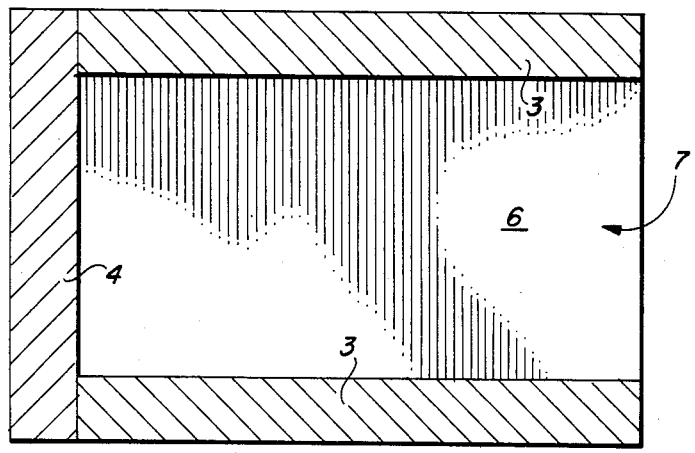
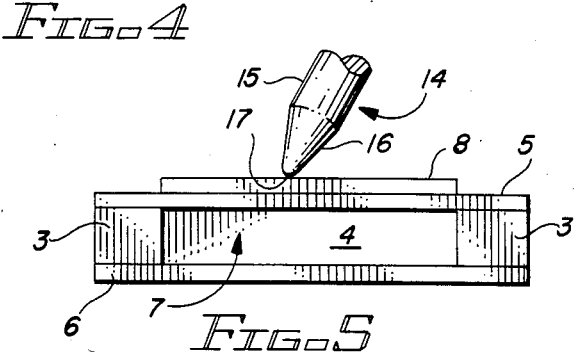
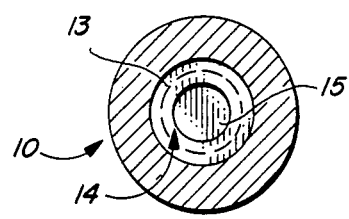

TURKEY CALL

BACKGROUND OF THE INVENTION

1. Field of the Invention

This invention relates to game calls and more particularly, to a turkey call which is characterized by a rectangular call box having a wood and formica frame, an opening in one short end of the frame and an interior sound chamber with a slate striker plate located on a formica surface. A striker completes the novel turkey call and includes a wooden handle having a cylindrical striker sound chamber therein, a plastic striker tip projecting from the opposite end of the handle and a plenum communicating between the striker sound chamber and the attached end of the striker tip. The opposite end of the striker tip is tapered to define a rounded tip end which is rubbed across the slate surface to set up vibrations and sounds in the call box sound chamber and striker sound chamber, which sounds simulate the call of a wild turkey.

2. Description of the Prior Art

Game calls of various description have been known for centuries. An early turkey call consisted simply of a piece of slate rubbed by a rock or hardwood stick to generate vibrations which simulate game noises to the ear. Through the years, more sophisticated game calls have been developed, with modern electronic, battery-powered counterparts of the early calls now commonly used to lure various game during hunting or filming expeditions.

An early "Bird Call" is disclosed in U.S. Pat. No. 1,034,307, dated July 30, 1912, to W. H. Saunders. The Saunders bird call includes a flat piece of slate which is rubbed by the rounded end of a corn cob, shaped to define a "tone tube". U.S. Pat. No. 2,643,483, dated June 30, 1953, to W. J. Walker, details a "Wild Game Calling Device" which includes a casing-like member enclosing a disc or slab of slate which is positioned to rub against the ends of pins or pegs, designed for relative rotation with respect to the slate. Variations in the sound emitted, both as to tone and volume, are obtained by pressing selected areas of the casing carrying the pegs during relative rotation of the parts. A "Squirrel Call" is disclosed in U.S. Pat. No. 2,629,968, dated Mar. 3, 1953, to G. L. Herter. The Herter squirrel call includes a generally rectangular-shaped box having rounded ends and a hollow interior. A thin reed plate closes the top of the box and projects over one edge of the box to define a striking edge. The rough or knurled edge of an elongated striker bar is struck or rubbed against the striking edge of the reed plate to simulate the sound of a squirrel. U.S. Pat. No. 2,958,157, dated Nov. 1, 1960, to W. P. Tannehill, discloses a "Bird Call" which includes a sound-producing box having rounded ends and a sheet of slate closing the top. The bottom of the box is provided with a dovetail slot for receiving a cooperating dovetail flange provided in a rectangular-shaped striker. A "Wild Fowl Call" is detailed in U.S. Pat. No. 3,100,948, dated Aug. 20, 1963, to E. J. Tax. The Tax game calling device is characterized by an elongated, hollow box having a flat bottom, an open top, tapered sides and a handle projecting from one end. An actuator arm projects longitudinally over the open top of the box and is pivotally anchored to the box at one end. A bar of slate is clipped to the actuator arm in transverse relationship and the call emits noises which simulate the call of a wild fowl when the slate bar is rubbed across the projecting edges of the sides of the box, responsive to manipulation of the activator arm. A Duck Call is disclosed in U.S. Pat. No. 2,642,699, dated June 23, 1953, to C. D. Green. The Green duck call includes an elongated bar having a plurality of equally spaced teeth on one surface thereof and a complimentary striker piece which is characterized by a hollow amplifying tube provided with a sharp edge for engaging the teeth on the bar, to simulate the call of a wild duck.

It is an object of this invention to provide a turkey call which is characterized by a call box having an interior sound chamber, a slate striker plate which is coextensive with the sound chamber, and a striker for engaging the slate striker plate to simulate the call of a turkey. By describing the striker plate as "coextensive with the sound chamber", applicant means that the extension of the plate is defined by an area equal to and positioned in vertically overlying alignment with one of the interior walls of the sound chamber.

Another object of this invention is to provide a new and improved turkey call which is sufficiently small to be held in the palm of the hand and includes a rectangular frame constructed of cedar strips, a formica top and bottom, a rectangular-shaped interior sound chamber and a slate striker plate, with an elongated striker having a solid plastic striker tip for rubbing against the slate striker plate and simulating the call of a wild turkey.

Yet another object of this invention is to provide a new and improved turkey call which is characterized by a rectangular-shaped box having a thin top and bottom, an open end communicating with a rectangular-shaped interior sound chamber and a slate striker plate secured to the top of the box, which slate striker plate is coextensive with the sound chamber, and further including an elongated striker having a cylindrically-shaped interior striker sound chamber and a plastic tip for engaging the slate striker plate and effecting a sound which simulates the call of a wild turkey.

Still another object of this invention is to provide a turkey call which includes as a first element, a rectangular-shaped call box constructed of cedar side member, a cedar end member, formica sheets closing the cedar members to define a sound chamber which is open to the atmosphere at one end and a slate striker plate glued to one of the formica sheets and coextensive in size with the sound chamber. The second element of the turkey call is characterized by a hollow, elongated striker having a solid plastic tip projecting from one end and communicating with the hollow interior of the striker, for rubbing against the slate plate and generating sounds which simulate the call of a wild turkey.

SUMMARY OF THE INVENTION

These and other objects of this invention are provided in a turkey call which is characterized by a rectangular-shaped call box having a thin profile and constructed of cedar side and end strips, with a pair of formica plates covering the top and bottom of the strips, leaving one end open to define a hollow rectangular-shaped sound chamber. A slate striker plate is glued to one of the formica plates and is coextensive in size with the interior sound chamber and a wooden striker having a cylindrical bore in one end and a length of solid plastic tapering to a blunt contact surface projecting from the opposite end, is used to contact the slate striker plate and generate sounds in the call box sound chamber and the hollow striker which simulate the call of a wild turkey.

BRIEF DESCRIPTION OF THE DRAWING

The invention will be better understood by reference to the accompanying drawing, wherein:

FIG. 1 is a perspective view of a preferred embodiment of the call box and striker elements of the turkey call of this invention;

FIG. 2 is a sectional view, taken along line 2—2, of the call box illustrated in FIG. 1;

FIG. 3 is a sectional view, taken along line 3—3, of the striker illustrated in FIG. 1;

FIG. 4 is a sectional view, taken along line 4—4, of the call box illustrated in FIG. 1;

FIG. 5 is a front end view, partially in section, of the call box and striker tip, with the striker tip contacting the slate striker plate; and FIG. 6 is a top view of the striker.

DESCRIPTION OF THE PREFERRED EMBODIMENTS

Referring to FIGS. 1-4 and 6 of the drawing, the turkey call of this invention is generally illustrated by reference numeral 1. The turkey call 1 consist of two basic elements, a rectangular call box 2 and a striker 9. In a most preferred embodiment of the invention the call box 2 is characterized by a pair of parallel side members 3, joined at one end by an end member 4 and open at the opposite end. A thin base 6 spans the side members 3 and the end member 4 on the bottom thereof and a thin cap 5 closes the call box 2, except for the open end which communicates with a rectangular-shaped box sound chamber 7. A thin, rectangular-shaped slate striker plate 8 is glued or otherwise secured to the cap 5 and is coextensive in size with the box sound chamber 7 that is, the slate striker plate 8 has an area the same as, and is in vertically overlying alignment with, the portion of the cap 5 which makes up the upper wall of the chamber 7, as illustrated. The front edge 18 of the slate striker plate 8 extends in the same plane with the front edges of the cap 5, base 6 and the side members 3.

In a preferred embodiment of the invention the striker 9 element of the turkey call 1 includes a generally cylindrically-shaped striker handle 10, which is provided with a cylindrically-shaped striker sound chamber 13 in an upper portion thereof and a round, blunt striker tip 14 projecting from the opposite end thereof. The striker tip 14 includes a generally cylindrically-shaped tip body 15, terminated at one end by a tip taper 16 and a tip end 17, and at the opposite end by a tip base 19, which is securely embedded in the opposite end of the striker handle 10. In another preferred embodiment of the invention a handle plenum 12 communicates between the tip base 19 of the tip body 15 and the striker sound chamber 13, located in the upper end of the striker handle 10.

In a most preferred embodiment, the handle plenum 12 is smaller in diameter than the diameter of the striker sound chamber 13, in order to enhance the transmission of vibrations from the striker tip 14 to the striker sound chamber 13.

Referring now to FIG. 5 of the drawing, the turkey call 1 is used by manipulating the striker 9 such that the tip end 17 of the striker tip 14 contacts the slate striker plate 8 located on the call box 2, as illustrated. The striker handle 10 is then manipulated to move the tip end 17 across the surface of the slate striker plate 8 with scratching motions of varying length, while adjusting the contact pressure between the tip end 17 and the slate striker plate 8. These motions of the striker 9 create vibrations in the slate striker plate 8 and the tip body 15 of the striker 9, which vibrations are transmitted through the cap 5 to the air located in the box sound chamber 7 and through the tip body 15 and handle plenum 12 to the striker sound chamber 13, to simulate the call of a wild turkey. With practice, considerable skill can be developed in the manipulation of the tip end 17 against the slate striker plate 8 to create vibrations and corresponding sounds which closely simulate the wild turkey call. Furthermore, the sound is amplified, not only through the box sound chamber 7, but also through the striker sound chamber 13 and is therefore rendered more audible to the game.

An important feature of the turkey call of this invention is the location of the slate striker plate 8 directly over and coextensive with the rectangular box sound chamber 7, in order to transmit vibrations from the tip body 15 through the cap 5 to the air in the box sound chamber 7. It has surprisingly been found that a hard material such as a laminated thermosetting material commonly known as "formica", easily and readily transmits the vibrations from the tip body 15 and the slate striker plate 8 into the box sound chamber 7. The base 6, which is also most preferably shaped from formica, serves to further enhance the quality of the sound emitted from the box sound chamber 7, due to its corresponding hardness and ease of transmitting vibration. Furthermore, it is also been found that wood, and particularly cedar wood, is ideal material of construction for the side members 3 and the end member 4, under circumstances where formica is used as the cap 5 and the base 6. This contrast between the hardness of the formica cap 5 and base 6 and the relative softness of the supporting cedar side members 3 and end member 4, coupled with the rectangular shape of the box sound chamber 7, apparently serves to transmit vibrations into the box sound chamber 7 from the entire slate striker plate 8 in an optimum manner, with a dampening of the vibrations in the side members 3 and end member 4. A clear, loud sound of high quality is therefore emitted from the box sound chamber 7. Experimentation has further shown that a slate striker plate 8 of about 1/16th inch in thickness is optimum for receiving and transmitting vibrations to the box sound chamber 7. Furthermore, formica having a thickness in the range of from about 1/32 to about 1/16 of an inch, and most preferably about 1/32 of an inch, is most preferred for use in the construction of the cap 5 and the base 6 in the turkey call 1. It is also been found that a rectangular box sound chamber 7 most preferably ranging in height from about 1/16th of an inch to about one quarter of an inch, and in width from about 2½ inches to about 1¾ inches, is ideal for transmitting sound of high quality from the turkey call 1. A most preferred dimension for the box sound chamber 7 is about one quarter of an inch in height by about 1 and ¾ of an inch in width, when the slate striker plate 8, cap 5 and base 6 are characterized by the dimensions and materials set forth above.

Another important discovery regarding the turkey call 1 of this invention is the requirement that the call box 2 be rectangular in configuration and the sound box chamber 7 be significantly wider than its height. This feature, in combination with the selection of a slate striker plate 8 which is coextensive in size with the box sound chamber 7, and a choice of materials of construction which include cedar side members 3 and a cedar end member 4, with a formica cap 5 and base 6, combine to produce a turkey call 1 which is extremely sensitive, easy to hold and use and is characterized by optimum efficiency in producing noises which closely simulate the call of a wild turkey.

Another important feature of the turkey call of this invention is the design of the striker 9 component. The striker 9 is provided with a striker handle 10 having a striker sound chamber 13 which is generally cylindrical in configuration and is bored through one end of the striker handle 10, as illustrated in FIG. 3. The tip body 15, which is constructed of a solid thermoplastic or thermoresin material commonly known as "plastic", is provided with a tip taper 16 at one end, which tapers to a smoothly rounded tip end 17 and is embedded in the opposite end of the striker handle 10 from the striker sound chamber 13, at the tip base 19. Transmission of vibrations created by rubbing the tip end 17 against the slate striker plate 8 to the striker sound chamber 13 is enhanced by a handle plenum 12 located in the interior of the striker handle 10, one end of which handle plenum 12 communicates with the tip base 19 and the other with the striker sound chamber 13. As heretofore noted, it has surprisingly been found that a handle plenum 12 having a smaller diameter than the striker sound chamber 13 more efficiently transmits vibrations from the tip body 15 to the striker sound chamber 13, than a bore of uniform size extending to the tip base 19. Accordingly, the combination of a shaped box sound chamber 7 having the dimensions described above, and a striker sound chamber 13 designed to communicate by means of the handle plenum 12 with the striker tip 14, serves to accurately reproduce and emit the call of a wild turkey, in the hands of one who has practiced using the turkey call 1 of this invention. In yet another most preferred embodiment of the invention the striker handle 10 of the striker 9 is about ⅜ of an inch in diameter and the tip end 7 is blunt and rounded, in order to facilitate easy manipulation of the tip end 7 across the surface of the slate striker plate 8 at selected angles of inclination and with varying contact pressure, to accurately reproduce the call of a wild turkey. In a further most preferred embodiment of the invention, the diameter of the tip end 17 at the point where the tip taper 16 terminates, is about 1/16 of an inch, and the striker 9 is from about ½ to about 18 inches in length.

While the preferred embodiments of the invention have been described above, it will be recognized and understood the various modifications may be made therein and the appended claims are intended to cover all such modifications which may fall within the spirit and scope of the invention.

Having described my invention with the particularity set forth above, what is claimed is:

1. A turkey call comprising a generally rectangular-shaped call box having rectangular walls enclosing a rectangular-shaped box sound chamber in the interior of said call box; a rectangular-shaped opening provided in one end of said call box, said opening communicating with said box sound chamber; a slate striker plate secured to an outside surface of one of said walls of said call box, said slate striker plate being provided in substantially coextensive relationship with respect to said box sound chamber; and a striker characterized by a handle, a cylindrically-shaped open striker sound chamber provided in one end of said handle and a blunt striker tip projecting from the opposite end of said handle for engaging said slate striker plate on said call box and generating sounds which simulate the call of a wild turkey.

2. The turkey call of claim 1 wherein said call box is constructed of a cedar frame and a formica cover.

3. The turkey call of claim 1 wherein said striker tip is constructed of a plastic material.

4. The turkey call of claim 1 wherein:
 (a) said call box is constructed of a cedar frame and a formica cover; and
 (b) said striker tip is constructed of a plastic material.

5. The turkey call of claim 4 further comprising a plenum in said handle, said plenum connecting said striker sound chamber and said striker tip and having a diameter less than the diameter of said striker sound chamber.

6. A turkey call comprising a generally rectangular-shaped call box characterized by a pair of side members oriented in spaced, generally parallel relationship; an end member joining said side members at one end of said side members; a base spanning said side members and said end member on one side thereof; a cap corresponding in size to said base and spanning said side members and said end member on the opposite side thereof to define a rectangular sound chamber open at one end; a slate striker plate secured to said cap, said slate striker plate oriented in substantially coextensive relationship with respect to said sound chamber; and a striker having a handle and a substantially blunt plastic tip carried by said handle, for engaging said slate striker plate.

7. The turkey call of claim 6 further comprising a generally cylindrically-shaped striker sound chamber provided in said handle.

8. The turkey call of claim 6 wherein said side members and said end member are cedar.

9. The turkey call of claim 6 wherein said cap and said base are formica.

10. The turkey call of claim 6 wherein:
 (a) said side members and said end member are cedar; and
 (b) said cap and said base are formica;

11. The turkey call of claim 6 further comprising a generally cylindrically-shaped striker sound chamber provided in said handle, and wherein:
 (a) said side members and said end member are cedar; and
 (b) said cap and said base are formica;

12. The turkey call of claim 11 wherein said tip of said striker is a solid plastic material and said handle is wood.

13. The turkey call of claim 7 further comprising a plenum in said striker, said plenum having a diameter less than the diameter of said striker sound chamber and extending between said striker sound chamber and said tip.

14. The turkey call of claim 7 further comprising a plenum in said striker, said plenum having a diameter less than the diameter of said striker sound chamber and extending between said striker sound chamber and said tip, and wherein:
 (a) said side members and said end member are cedar;
 (b) said cap and said base are formica; and
 (c) said tip of said striker is a solid plastic material and said handle is wood.

15. A turkey call comprising:
 (a) a rectangular-shaped call box characterized by a pair of spaced, parallel side members; an end member connecting said side members at one end thereof; a formica base covering one side of said side members and said end member; a formica cap covering the opposite side of said side members and said end member, said cap oriented in parallel, spaced relationship with respect to said base, and said end member, said side members, said base and said cap defining a rectangular-shaped interior box sound chamber in said call box; an opening at the end of said call box remote from said end member, said opening communicating with said sound chamber; and a slate striker plate attached to said cap, said slate striker plate being substantially coextensive in length and width with said sound chamber; and (b) a striker characterized by a handle, a generally cylindrically-shaped striker sound chamber located in one end of said handle; a striker tip projecting from the opposite end of said handle from said one end for engaging said slate striker plate on said call box; and a plenum in said handle, said plenum communicating with said striker sound chamber and said striker tip.

16. The turkey call of claim 15 wherein said side members and said end member are cedar.

17. The turkey call of claim 15 wherein said striker tip is a solid plastic material and said handle is wood.

18. The turkey call of claim 15 wherein:
    (a) said side members and said end member are cedar; and
    (b) said striker tip is a solid plastic material and said handle is wood.

19. The turkey call of claim 15 wherein said plenum is characterized by a diameter which is less than the diameter of said striker sound chamber.

20. The turkey call of claim 15 wherein:
    (a) said side members and end member are cedar;
    (b) said striker tip is a solid plastic material and said handle is wood; and
    (c) said plenum is characterized by a diameter which is less than the diameter of said striker sound chamber.

* * * * *